UNITED STATES PATENT OFFICE.

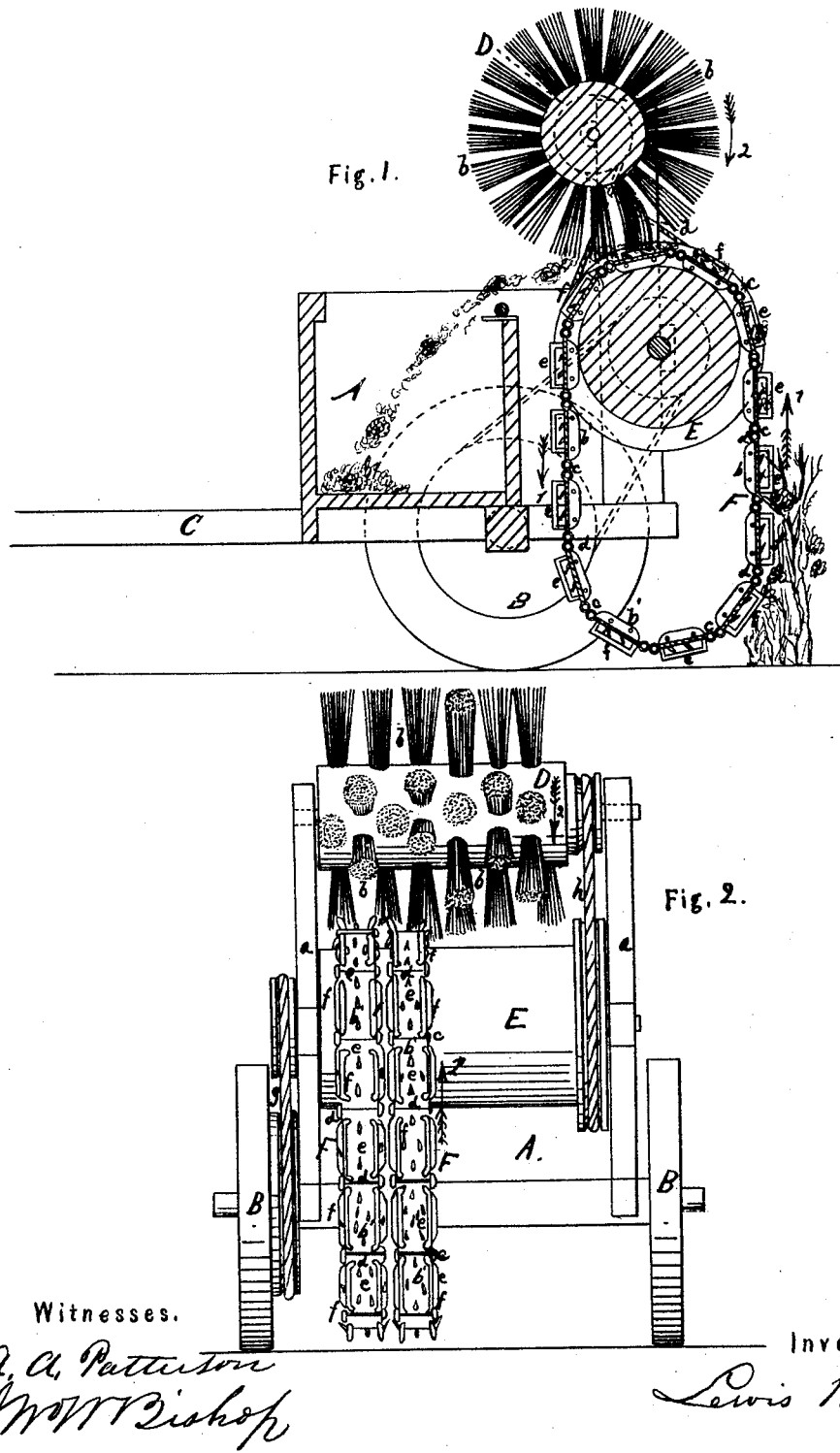

LEWIS BISHOP, OF TALLADEGA, ALABAMA.

IMPROVEMENT IN COTTON-HARVESTERS.

Specification forming part of Letters Patent No. 24,609, dated July 5, 1859.

*To all whom it may concern:*

Be it known that I, LEWIS BISHOP, of Talladega, in the county of Talladega and State of Alabama, have invented a new and Improved Cotton Picker or Harvester; and I do hereby declare that the following is a full, clear, and exact description of the same, reference being had to the annexed drawings, making a part of this specification, in which—

Figure 1 is a side sectional elevation of my invention. Fig. 2 is a back elevation of the same.

Similar letters of reference indicate corresponding parts in the two figures.

This invention consists in the employment or use of a series of endless picker-chains placed on a revolving cylinder and used in connection with a revolving stripping-brush, the above parts being attached to a cart, or to a box mounted on wheels, and the whole arranged, as hereinafter fully shown and described, so that as the cart is drawn along the cotton will be picked from the bolls by the picker-chains, and the cotton stripped therefrom by the revolving-brush and deposited in the box or body of the cart.

To enable those skilled in the art to fully understand and construct my invention, I will proceed to describe it.

A represents a box, which is mounted on wheels B B, C being the shafts to receive the animal that draws the machine along.

To the back part of the frame of the box A two uprights, $a\ a$, are secured, one at each side of the machine, and between the upper parts of these uprights and above the box A a cylinder, D, is placed, said cylinder having radial brushes $b$ fitted in its periphery.

Between the two uprights $a\ a$ and below the brush-cylinder D a cylinder, E, is placed. This cylinder has its bearings at the outer sides of the standards, so that the cylinder E will project a trifle farther outward or back from the box A, as shown clearly in Fig. 1.

On the cylinder E a series of endless picker-chains, F, are placed. These chains are formed of a series of links, $b'$, constructed of sheet metal and swaged at their sides or edges, so as to project inward or backward. The plates $b'$ are connected by loops $c$, which are fitted loosely in eyes $d$, formed at the ends of the plates $b'$, as shown clearly in Fig. 1.

Through the plates $b'$ a series of teeth, $e$, pass. These teeth project through the plates in inclined positions, as shown clearly in Fig. 1, the teeth pointing upward as the chains ascend at the outer side of the machine. The chains F extend nearly down to the surface of the ground, and a sufficient number are used to extend the whole width of the cylinder E, although two only are shown in Fig. 2. More or less teeth may be placed in each plate $b$, and guard-rods $f$ may be attached to each plate longitudinally, one at each side.

The cylinder E is rotated from one of the wheels B by a belt, $g$, and the brush-cylinder D is rotated from the cylinder E by means of a belt, $h$.

The operation is as follows: As the machine is drawn along the endless picker-chains F move in the direction indicated by the arrows, and the teeth $e$ pick the cotton from the bolls of the plants, (see Fig. 1;) and as the links or plates $b'$ pass over the top of the roller E the cotton is stripped from the teeth $e$ by the brushes $b$, the cylinder D of which rotates in the direction indicated by the arrow 2. The brushes $b$ throw the cotton into the box A.

I would remark that the picker-chains F may be constructed in various ways, although the mode of construction herein described would probably be as economical and as durable as any.

Having thus described my invention, what I claim as new, and desire to secure by Letters Patent, is—

The endless picker-chains F, placed on the cylinder E, in connection with the brush-cylinder D, the above parts being attached to a cart or to a box or receptacle, A, mounted on wheels, and the whole arranged to operate as and for the purpose set forth.

LEWIS BISHOP.

Witnesses:
A. A. PATTERSON,
JNO. W. BISHOP.